(12) United States Patent
Colombot

(10) Patent No.: US 10,729,291 B2
(45) Date of Patent: Aug. 4, 2020

(54) INSTALLATION FOR DRY TOILETS INSTALLED IN A BUILDING

(71) Applicant: Sanisphère, Saint-Ferréol-Trente-Pas (FR)

(72) Inventor: Pierre Colombot, Saint-Ferréol-Trente-Pas (FR)

(73) Assignee: SANISPHERE, Saint-Ferreol-Trente-Pas (FR)

( * ) Notice: Subject to any disclaimer, the term of this patent is extended or adjusted under 35 U.S.C. 154(b) by 17 days.

(21) Appl. No.: 16/262,041

(22) Filed: Jan. 30, 2019

(65) Prior Publication Data

US 2019/0254489 A1 Aug. 22, 2019

(30) Foreign Application Priority Data

Feb. 21, 2018 (FR) .................................... 18 51469

(51) Int. Cl.
| | |
|---|---|
| *A47K 11/02* | (2006.01) |
| *C05F 17/921* | (2020.01) |
| *C05F 17/964* | (2020.01) |
| *C05F 17/90* | (2020.01) |

(52) U.S. Cl.
CPC ............ *A47K 11/02* (2013.01); *C05F 17/939* (2020.01); *C05F 17/964* (2020.01); *C05F 17/90* (2020.01)

(58) Field of Classification Search
CPC ...... A47K 11/00; A47K 11/02; A47K 11/023; C05F 17/939; C05F 17/964; C05F 17/90; E03D 5/014
USPC .................. 4/449, 111.2, 461, 318
See application file for complete search history.

(56) References Cited

U.S. PATENT DOCUMENTS

| | | | | |
|---|---|---|---|---|
| 3,522,613 A | * | 8/1970 | Botsford | E03D 11/11 4/111.5 |
| 3,829,909 A | * | 8/1974 | Rod | E03D 5/016 4/318 |
| 3,882,552 A | * | 5/1975 | Turner | A47K 11/023 4/318 |
| 4,164,049 A | | 8/1979 | Michael | |
| 4,254,515 A | * | 3/1981 | Kiyama | A47K 11/02 4/449 |
| 6,081,940 A | * | 7/2000 | Nien | A47K 11/02 4/449 |

(Continued)

FOREIGN PATENT DOCUMENTS

FR 2 823 201 A1 10/2002

OTHER PUBLICATIONS

Ralph Thielen, "Une gestion naturelle des eaux domestiques avec un prototype de toilettes à compost dans le cadre d'un projet d'habitation durable" 2011, Equilibre Phase Study Report.

*Primary Examiner* — Benjamin R Shaw
(74) *Attorney, Agent, or Firm* — Ladas & Parry LLP; Malcolm J. MacDonald

(57) ABSTRACT

The invention relates to an installation for toilets (2) installed in a building and comprising, for each of the toilets (2), firstly a separator device (20) for separating liquid effluent and solid waste, and secondly a transfer device (20) for moving solid waste into a descent tube (21), the descent tube (21) having a plurality of through openings (22) communicating with a plurality of transfer devices belonging to toilets installed on storeys of the building, and enabling solid waste to be taken by gravity to a treatment device positioned at the bottom of the building.

10 Claims, 4 Drawing Sheets

(56) References Cited

U.S. PATENT DOCUMENTS

| | | | | |
|---|---|---|---|---|
| 2002/0144339 A1* | 10/2002 | Colombot | ............... | A47K 11/02 4/449 |
| 2004/0148690 A1* | 8/2004 | Freeman | ................. | E03D 11/11 4/449 |
| 2007/0199140 A1* | 8/2007 | Lee | ......................... | A47K 11/02 4/449 |
| 2016/0107910 A1* | 4/2016 | Park | ........................... | C02F 3/28 210/114 |
| 2016/0122994 A1* | 5/2016 | Thom | ........................ | B60P 1/04 414/354 |

\* cited by examiner

INSTALLATION FOR DRY TOILETS INSTALLED IN A BUILDING

The present invention relates to the general technical field of devices for sanitizing, removing, and transforming fecal matter and urine.

The invention relates more particularly to the category of so-called "dry" toilets that do not make use of an auxiliary removal fluid, and that make it possible to do without a connection to a general water removal network.

The state of the art proposes numerous variant embodiments of so-called "dry" toilets. For example, as described in patent FR 2 823 201, such a toilet installation generally comprises a toilet room adjacent to a technical facility. The toilet room includes equipment such as a toilet seat or a squat toilet pan. That equipment includes a gravity removal opening for liquid effluent and for solid waste, such as fecal matter and toilet paper. The liquid effluent and the solid waste are removed into the technical facility where they are subjected to treatment operations such as separation, composting, or worm composting.

Such toilets are generally used only at events, on worksites, or on sites that are isolated, such as hiking departures or mountain refuge huts, or indeed individual houses. Nevertheless, such waterless toilets are installed in buildings only under exceptional circumstances, except for some experiments.

According to the project developed in the context of the Equilibre housing cooperative study phase report (Compost toilets storey building in Switzerland), by Ralph Thielen in November 2011, each of the toilets in the building has a seat provided with gravity removal of liquid effluent and solid waste that is connected directly to a vertical pipe leading to a composter placed in a technical facility arranged at the bottom of the building. Each pipe fitted to a seat acts under gravity only to transfer solid waste and liquid effluent from the apartment to the technical facility. In practice, installing such an installation in a building is found to be relatively complicated to carry out successfully. Furthermore, the size of such an installation becomes unacceptable as soon as the number of superposed apartments to be equipped increases.

In the field of toilets that use water, the patent U.S. Pat. No. 4,164,049 describes a sanitary installation for toilets installed on the storeys of a building. Each of the toilets is provided with a seat and a water feed pipe. Those toilets are provided with outlet tubes connected to a common duct for removing liquid effluent and solid waste, leading to a collection network. Such an installation requires water to be installed in order to operate.

The present invention seeks to remedy the drawbacks of the state of the art by proposing a novel installation for dry toilets designed to be relatively easy to install successfully while presenting size that is limited, even for a large number of superposed dwellings that are to be equipped in a building.

In order to achieve these objects, the present invention provides an installation for toilets installed on a plurality of superposed storeys of a building and each comprising a seat provided with a gravity removal opening for liquid effluent and solid waste, the installation including conveying equipment enabling solid waste to be conveyed by gravity to a solid waste treatment device placed in a technical facility at the bottom of the building.

According to the invention, the conveying equipment comprises, for each of the toilets, firstly a separator device for separating liquid effluent and solid waste coming from the gravity removal opening and adapted to use gravity to take the liquid effluent to a reception tank and the solid waste to a solid waste storage zone, and secondly a transfer device for moving the solid waste from the storage zone to a descent tube by passing through a through opening leading into the descent tube and fitted with a shutter system preventing air from passing from the descent tube to the toilet, at least so long as the transfer device is not moving said solid waste, the descent tube includes a plurality of through openings communicating with a plurality of transfer devices belonging to toilets installed on the storeys of the building and it enables solid waste to be taken by gravity to the treatment device.

The installation of the invention also includes in combination one and/or more of the following additional characteristics:

- the descent tube is installed outside the building;
- at least one transfer device comprises an upwardly-open bottomless drawer co-operating with a plane surface to form a solid waste storage zone, the drawer including a solid waste thrust panel extending facing a shutter panel that closes the through opening of the descent tube while the transfer device is not moving said solid waste;
- at least one transfer device comprises a drawer with a bottom that is mounted to be retracted when the drawer is positioned inside the descent tube, or a drawer that is pivotally mounted enabling the drawer to be turned over inside the descent tube in order to dump the solid waste therein;
- the descent tube forms part of a ventilation circuit including fans and serving to cause air to flow from each of the toilets towards an air outlet;
- each transfer device includes electronic control means enabling it to operate as a function of the use of the toilets, the various control means being operated in mutually synchronized manner so as to allow only one of the transfer devices to operate at any one time;
- the reception tank for liquid effluent is integrated in the floor slab of the toilet;
- the reception tank for liquid effluent includes a siphon cover defining a passage for the liquid effluent leading into liquid effluent stagnating in the tank, which tank is provided with a liquid effluent overflow removal pipe;
- the siphon cover of the liquid effluent reception tank is removable; and
- at least one of the toilets includes nozzles for spraying cleaning liquid under pressure into the liquid effluent reception tank.

Various other characteristics appear from the following description given with reference to the accompanying drawings, which show embodiments of the invention by way of non-limiting examples.

Figure 1:
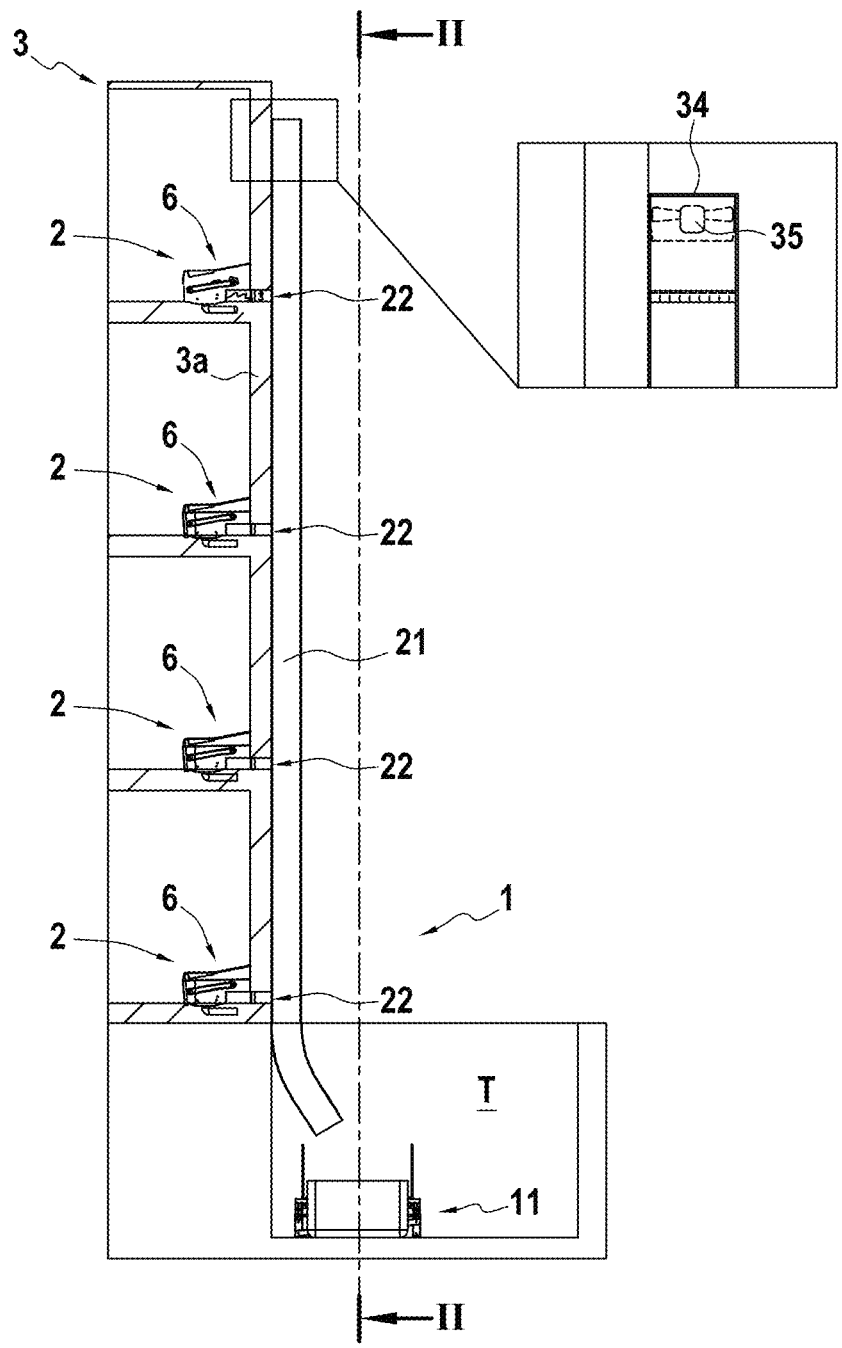
FIG. 1 is a side elevation section view of an embodiment of a toilet installation in accordance with the invention in a four-storey building.
Figure 2:
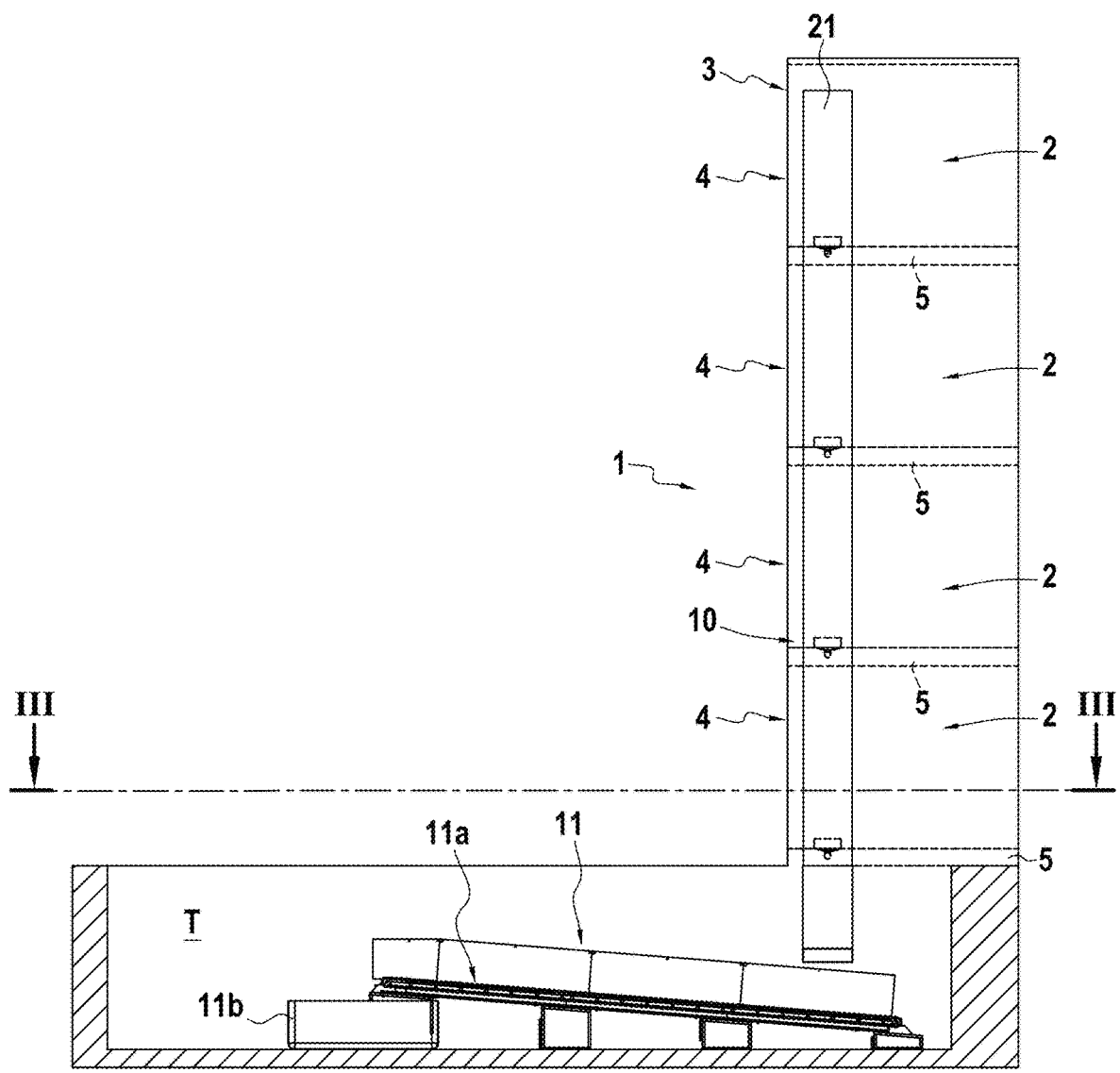
FIG. 2 is a front elevation section view of an embodiment of a toilet installation in accordance with the invention substantially on lines II-II of FIG. 1.
Figure 3:
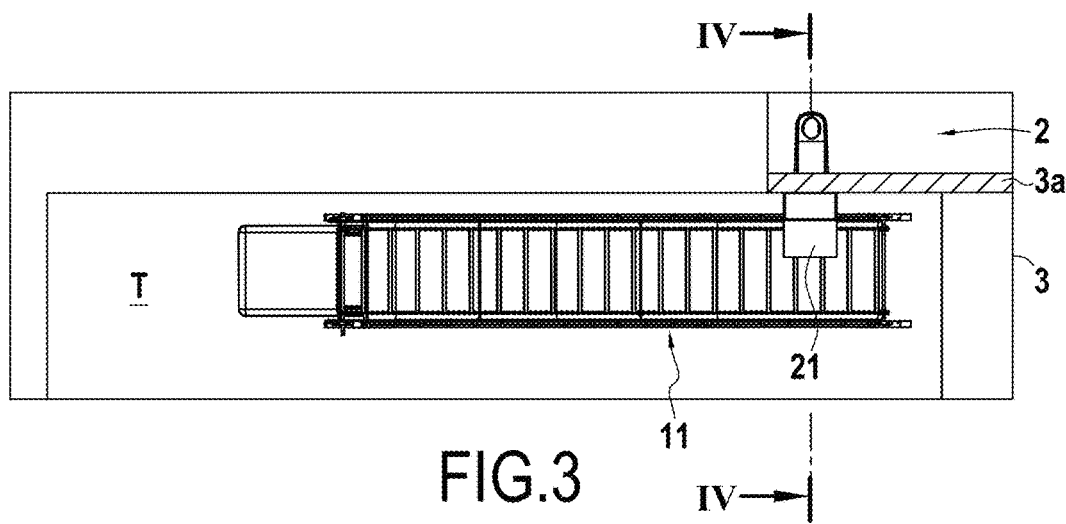
FIG. 3 is a cross-section of the toilet installation taken substantially on lines III-III of FIG. 2.

As can be seen in FIGS. 1 to 3, the invention relates to an installation 1 for so-called "dry" toilets 2 installed in a building 3 in the general sense. A building 3 is a construction comprising a plurality of storeys 4, there being four of them in the example shown when including a ground floor, each of these storeys having a single toilet in the drawings. Each storey 4 extends between two successive decks or successive slabs 5 one forming the floor and the other forming the ceiling by being connected in particular to outside walls, one of which 3a is shown in the drawings. Naturally, the installation 1 of the invention can be implemented for a building 3 having some other number of storeys, each of which is provided with one or more toilets 2.

Figure 4:
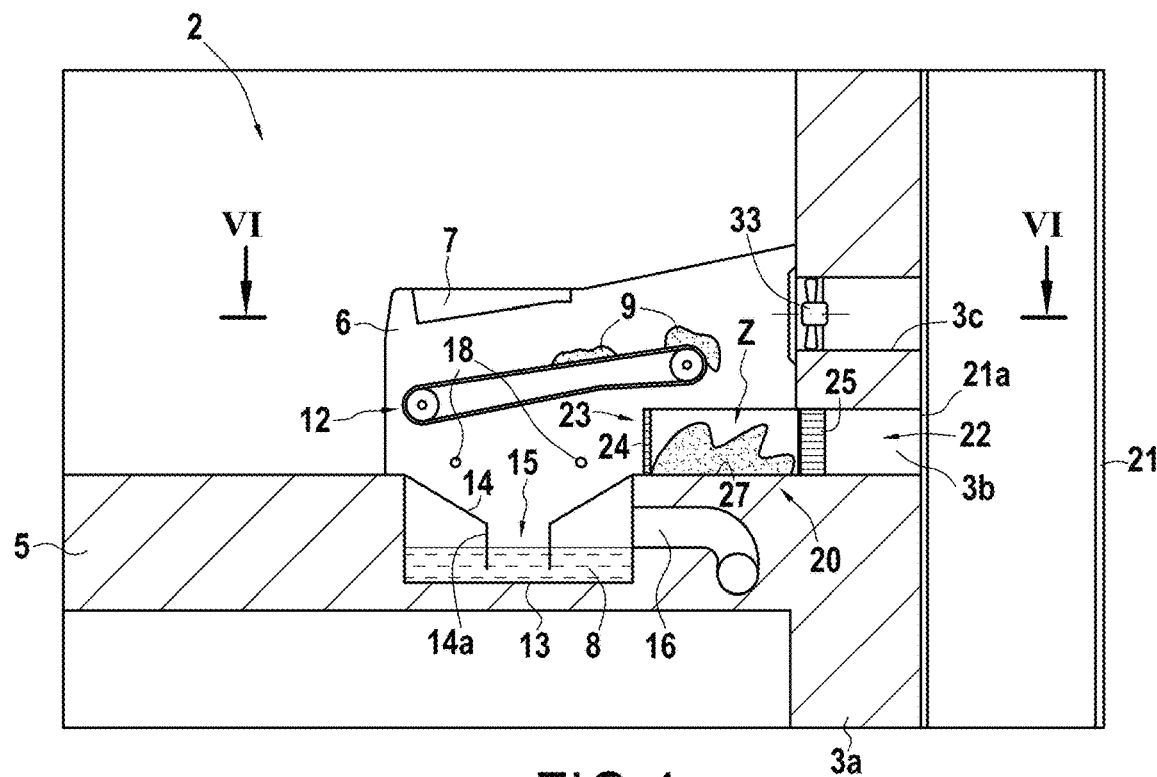
FIG. 4 is a detail view in section on lines IV-IV of FIG. 3 showing a toilet forming part of a toilet installation in accordance with the invention, in the filling position.
Figure 5:
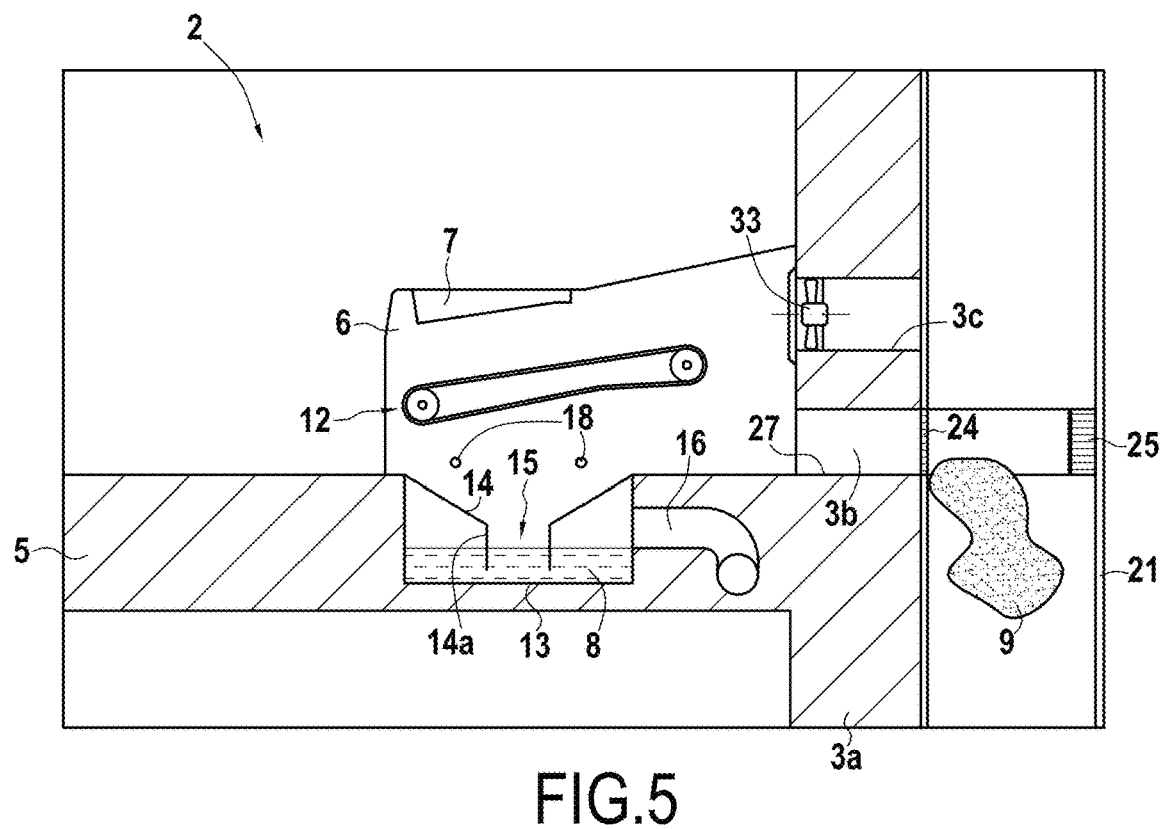
FIG. 5 is a detail view in section analogous to FIG. 4 of toilets forming part of a toilet installation in accordance with the invention, in the emptying position.
Figure 6:
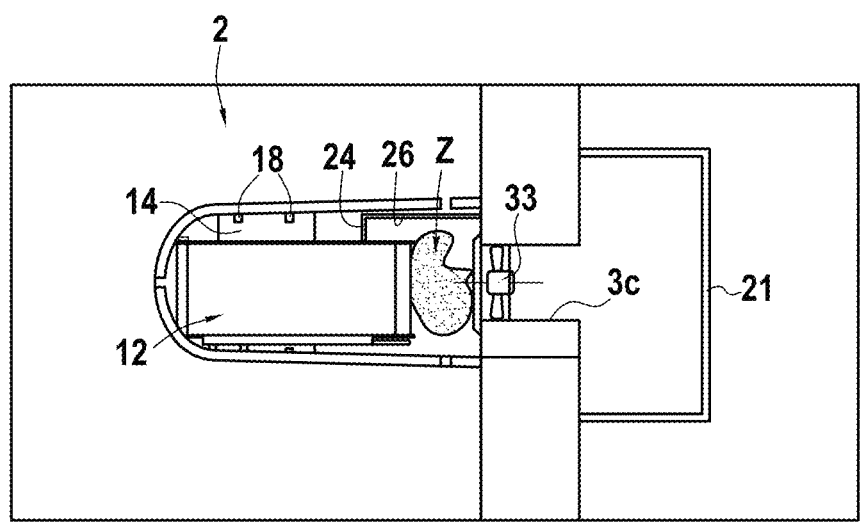
FIG. 6 is a cross-section view on lines VI-VI of FIG. 4 showing toilets forming part of a toilet installation in accordance with the invention, in the filling position.

As can be seen in FIGS. 4 to 6, each toilet 2 comprises a toilet room in which there is installed at least one seat 6 provided with a gravity removal opening 7 serving firstly to remove liquid effluent 8 such as urine and secondly solid waste 9 made up of fecal matter and toilet paper, in particular. The seat 6 is made in any appropriate manner to enable a person to sit down, or indeed in a more rudimentary variant to squat on a squat toilet pan.

The installation 1 includes conveying equipment 10 for conveying solid waste by gravity to a solid waste treatment device 11 placed in a technical facility T situated at the bottom of the building 3. The technical facility T is situated on the ground floor, or as shown in the drawings, in the basement of the building 3, being arranged inside or preferably outside the building.

According to a characteristic of the invention, the conveying equipment 10 includes, for each of the toilets 2, a separator device 12 for separating liquid effluent and solid waste. In the preferred embodiment shown in the figures, the separator device 12 corresponds to the device described in patent FR 2 973 213. In this example, the separator device 12 includes a sloping conveyor belt with the gravity removal opening 7 opening out above it. The sloping conveyor belt 12 is positioned to recover the liquid effluent and the solid waste falling from the gravity removal opening 7. The sloping conveyor belt 12 performs gravity separation between the liquid effluent 8, which is recovered from the bottom of the conveyor belt, and the solid waste 9, which is moved in translation by the conveyor belt to a high portion so as to drop into a storage zone Z where the waste accumulates to form a heap.

Naturally, the separator device 12 may be made in some other manner. Thus, the separator device 12 may be made simply as a toilet pan having two bowls, one of which is for the liquid effluent 8 and the other for the solid waste 9, with separation resulting from the user of the toilet being correctly positioned.

The separator device 12 is adapted to take the liquid effluent 8 by gravity to a reception tank 13. In the variant embodiment shown in the drawings, a portion of the reception tank 13 is positioned under the low portion of the conveyor belt 12.

In an advantageous variant embodiment, the reception tank 13 for liquid effluent is incorporated in the slab 5 of a toilet, in a zone situated under the seat 6. Incorporating the reception tank 13 in a high portion of the slab 5 enables the seat to remain at a conventional height above the floor on which the users of the toilet walk.

In an advantageous variant embodiment, the liquid effluent reception tank 13 includes a siphon-forming cover 14 defining a passage 15 for liquid effluent coming from the separator device 12. By way of example, going from its periphery, the siphon cover 14 presents a shape that slopes towards its central portion, where there is provided a tubular duct 14a defining the passage 15. The siphon cover 14 recovers the liquid effluent 8 on its top surface coming from the separator device 12.

This passage 15 leads to the liquid effluent 8 that is stagnating in the reception tank 13. For this purpose, the reception tank 13 has a liquid effluent overflow removal pipe 16. The removal pipe 16 is arranged to allow liquid effluent to stagnate over a depth that is sufficient for the tubular duct 14a of the cover defining the passage 15 always to be immersed in the liquid effluent stagnating in the reception tank 13. Such a configuration makes it possible to avoid air passing between the gravity removal opening 7 and the removal pipe 16.

In an advantageous embodiment variant, the siphon cover 14 is removably mounted on the liquid effluent reception tank 13. Such a configuration makes it easy to access the removal pipe 16 by taking off the siphon cover 14.

In an advantageous embodiment variant, each of the toilets 2 has nozzles 18 for spraying a cleaning liquid under pressure that is taken into the liquid effluent reception tank 13. In the example shown in the drawings, these nozzles 18 open out so as to bring the cleaning liquid onto the siphon cover 14. These nozzles 18 are triggered sequentially so as to enable the reception tank and the removal pipes to be cleaned and thus avoid struvite forming. For example, provision may be made to spray a liter of cleaning liquid once every hundred uses of the toilets. The cleaning liquid may be water, possibly having a struvite-degrading substance added thereto.

According to a characteristic of the invention, the conveying equipment 10 includes, for each toilet 2, a transfer device 20 serving to move solid waste from the storage zone Z to a descent tube 21 by passing through a through opening 22 leading into the descent tube 21. Each through opening 22 is arranged to allow solid waste 9 to be moved from the storage zone Z into the descent tube 21. According to a characteristic of the invention, the descent tube 21 has a plurality of through openings 22 communicating with a plurality of transfer devices 20 belonging to toilets 2 installed on different storeys 4 of the building.

It should be understood that a descent tube 21 is common for conveying by gravity the solid waste coming from the toilets 2 that are placed one above another down to the treatment device 11. The descent tube 21, which is vertical or almost vertical, is adapted to recover the solid waste coming from toilets 2 that are superposed or almost superposed. Advantageously, a descent tube 21 extends vertically to convey the solid waste from all of the toilets of the building that are in a superposed or almost superposed position. In the example shown, the descent tube 21 extends over the height of the four storeys of the building. Naturally, if the building has another series of superposed toilets, then the installation has a second descent tube 21 for serving the toilets in that second series of superposed toilets.

In an advantageous embodiment variant, the descent tube 21 is located outside the building 3 so that the descent tube 21 is separated from the toilets 2 by an outside wall 3a of the building. The descent tube 21 is preferably placed against the outside wall 3a of the building. Positioning the descent tube 21 outside the storeys without passing through the slabs 5 serves to limit the transmission of noise between the storeys and also to limit risks associated in particular with fire. In this variant embodiment as shown in the drawings, each through opening 22 includes a through hole 3b arranged in the outside wall 3a and communicating in leaktight manner with an orifice 21a formed in the descent tube 21. The solid waste can thus be transferred from the storage zone Z to the descent tube 21 by passing through a through opening 22.

The descent tube 21 presents a section and dimensions that are appropriate for providing gravity transfer of the solid waste coming from the various superposed toilets and delivered by the various transfer devices 20 connected to the descent tube 21.

The descent tube 21 is adapted to take the solid waste 9 by gravity to the solid waste treatment device 11 that is located in the technical facility T situated at the bottom of the building 3. Thus, the bottom end of the descent tube 21 penetrates into the technical facility T in order to take the solid waste 9 to the treatment device 11, which is of any appropriate type for treating and transforming solid waste by composting or worm composting. In the example shown in FIGS. 1 to 3, the treatment device 11 is in accordance with the device described in patent FR 3 040 279 which makes provision for using a conveyor belt 11a to convey a bed of waste that is fed by the descent tube 21. The bed of waste is moved over a determined duration so as to obtain a composted medium that drops into a composted medium recovery tank 11b.

The treatment device may also perform the technique described in patent FR 3 040 280 involving movable tanks having a volume of 0.1 cubic meters ($m^3$) to several cubic meters, that are positioned in succession under the descent tube 21, and that are moved when they are full so as to allow sufficient time to transform into compost or worm compost without risk of being contaminated with new solid waste.

The treatment device 11 may also include a hygiene step for destroying any pathogens capable of withstanding the composting or worm composting process.

The hygiene step preferably takes place after the fecal matter and toilet paper has been transformed by composting or worm composting. By way of example, it may consist in a temperature rise that is sufficient and of a duration that is sufficient to destroy the pathogens, in a chamber provided for this purpose.

This hygiene step may possibly be followed by a stage of re-seeding living organisms of bacteria, fungus, or other types, so as to improve the agronomic characteristics of the resulting final product.

Each transfer device 20 may be made by any mechanical system suitable for moving solid waste 9 from the storage zone Z to the descent tube 21. It should be considered that the solid waste 9 in the storage zone Z is accumulated in a receptacle 23 having storage capacity that is a function of the number of uses of the toilet. Typically, the storage capacity of the receptacle 23 is of the order of about one hundred uses of the toilet. The storage receptacle 23 thus occupies a filling position (FIGS. 4 and 6) during which solid waste drops from the separator device 12, and an emptying position (FIG. 5) during which the solid waste is dumped into the descent tube 21. The storage receptacle 23 goes from its filling position to its emptying position after following a travel stroke that is advantageously linear.

Each transfer device 20 thus includes control means, preferably electronic control means, for causing it to operate as a function of the use of the toilet. The control means may be operated manually or preferably automatically so as to cause the storage receptacle 23 to go from its filling position to its emptying position, and back again from its emptying position to its filling position. At the end of one movement cycle, the storage receptacle 23 is once more in position for receiving solid waste coming from the separator device 12.

In an advantageous embodiment variant, the controls of the transfer devices 20 that are associated with the descent tube 21 are operated in mutually synchronized manner so as to allow only one transfer device to operate at a time. In other words, the storage receptacles 23 are emptied at moments that are offset in time so as to avoid two storage receptacles 23 being emptied simultaneously into a descent tube 21.

Each transfer device 20 is provided with a drive mechanism (not shown) designed to move the solid waste 9 from the filling position (FIGS. 4 and 6) to the emptying position (FIG. 5). This drive mechanism is thus adapted to cause the storage receptacle 23 to go from its filling position to its emptying position, and back again from its emptying position to its filling position. This drive mechanism, which may be of any conventional type, being manual or automatic, may be in the form of a hinged arm, a piston, or a motor, for example. This drive mechanism is operated by the above-described control means that serve on each occasion to perform an operating cycle causing the storage receptacle 23 to go from its filling position to its emptying position, and then to return to its filling position.

In a variant embodiment shown in the drawings, a transfer device 20 includes as its storage receptacle 23 a drawer formed by a "thrust" rear panel 24 that extends facing a "shutter" front panel 25. The front and rear panels 24 and 25 are connected together by two connection panels 26. The drawer 23 thus forms a bottomless drawer co-operating with a plane surface 27 so as to constitute a receptacle that is upwardly open in order to receive solid waste 9 dropping from the separator device 12. Thus, the storage zone Z defined by the storage receptacle 23 is advantageously integrated in the transfer device 20.

The operation of the transfer device 20 stems directly from the above description.

After a given number of uses of one of the toilets, the drawer 23 is full of solid waste delivered by the separator device 12. The drive mechanism of the transfer device 20 is then actuated to move the drawer 23 from its filling position to its emptying position, and back again from its emptying position to its filling position. While it is moving, the drawer 23 passes through the through opening 22, i.e. the though hole 3b and the orifice 21a, with the rear panel 24 pushing the solid waste over the plane surface 27 until it drops by gravity into the descent tube 21. The drawer 23 is moved until the rear panel 24 comes at least level with the orifice 21a in the descent tube.

Naturally, the transfer device 20 may be made in a different manner. In another embodiment variant, the transfer device 20 comprises a drawer with a bottom that is mounted to be retracted when it is in position inside the descent tube. In another embodiment variant, the transfer device 20 has a drawer that is pivotally mounted so as to enable the drawer to be turned over inside the descent tube in order to dump the solid waste therein.

According to another characteristic of the invention, each through opening 22 has a shutter system 30 preventing air from passing from the descent tube 21 to the toilet 2, at least while the transfer device 20 is not moving said solid waste. In other words, the shutter device closes the through opening 22 hermetically so long as the storage receptacle 23 is occupying its filling position.

In a preferred embodiment variant shown in the drawings, the shutter system 30 is made using the front panel 25, which, when in the filling position of the drawer 23, shuts the through hole 3b and consequently shuts the through opening 22. The shutter system 30 thus prevents air coming from the descent tube 21 entering into the toilet. Furthermore, the front panel 25 may be provided with a thermal insulation element.

Naturally, it is possible to make use of a shutter system 30 that closes the through opening 22 hermetically on a continuous basis, even during operation of the transfer device 20. The shutter system can thus comprise a kind of airlock so that shutter systems take over from one another in order to ensure that the through opening 22 is shut continuously.

The installation of the invention includes a ventilation circuit that operates continuously to avoid smells rising into the toilet 2. It is possible to envisage connecting all of the toilets 2 to a ventilation circuit of the building, or to a ventilation circuit that is specific to the toilet.

In an advantageous embodiment variant as shown in the drawings, the descent tube 21 forms part of a ventilation circuit including fans 33 that cause air to flow from each of the toilets 2 to an air outlet 34 (FIG. 1). Each toilet 2 has a passage 3c between the descent tube 21 and the toilet 2, which passage is fitted with a fan 33. In the example shown, the passage 3c is made through the outside wall 3a of the building into the descent tube 21.

In this variant as shown, the descent tube 21 includes an extractor fan 35 at its top end for causing the air coming from the various toilets 2 to flow to the top portion of the descent tube 21, which includes the air outlet 34.

It should be observed that in another embodiment variant it is possible to envisage including the technical facility T in the ventilation circuit. In this embodiment variant, not shown, the technical facility T has an extraction chimney provided at its top end to serve as the air outlet 34 of the extractor fan 35. The descent tube 21 then no longer has the air outlet 34 nor the extractor fan 35, and thus serves as a ventilation tube allowing air to flow from the toilets 2 to the technical facility T via the descent tube 21. The technical facility T is preferably closed hermetically by having a single air inlet constituted by the descent tube 21 and a single air outlet presented by the extraction chimney.

The invention is not limited to the examples described and shown since various modifications may be made thereto without going beyond its ambit.

The invention claimed is:

1. An installation for toilets (2) installed on a plurality of superposed storeys (4) of a building (3) and each comprising a seat (6) provided with a gravity removal opening (7) for liquid effluent (8) and solid waste (9), the installation including conveying equipment (10) enabling solid waste to be conveyed by gravity to a solid waste treatment device (11) placed in a technical facility (T) at the bottom of the building, wherein the conveying equipment (10) comprises, for each of the toilets (2), firstly a separator device (20) for separating liquid effluent (8) and solid waste (9) coming from the gravity removal opening (7) and adapted to use gravity to take the liquid effluent to a reception tank (13) and the solid waste to a solid waste storage zone (Z), and secondly a transfer device (20) for moving the solid waste from the storage zone (Z) to a descent tube (21) by passing through a through opening (22) leading into the descent tube and fitted with a shutter system (30) preventing air from passing from the descent tube to the toilet, at least so long as the transfer device (20) is not moving said solid waste, the descent tube (21) including a plurality of through openings (22) communicating with a plurality of transfer devices belonging to toilets installed on the storeys of the building and enabling solid waste to be taken by gravity to the treatment device (11).

2. An installation according to claim 1, wherein the descent tube (21) is installed outside the building (3).

3. An installation according to claim 1, wherein at least one transfer device (20) comprises an upwardly-open bottomless drawer (23) co-operating with a plane surface (27) to form a solid waste storage zone (Z), the drawer including a solid waste thrust panel (24) extending facing a shutter panel (25) that closes the through opening of the descent tube while the transfer device is not moving said solid waste.

4. An installation according to claim 1, wherein at least one transfer device (20) comprises a drawer with a bottom that is mounted to be retracted when the drawer is positioned inside the descent tube, or a drawer that is pivotally mounted enabling the drawer to be turned over inside the descent tube in order to dump the solid waste therein.

5. An installation according to claim 1, wherein the descent tube (21) forms part of a ventilation circuit including fans (33, 35) and serving to cause air to flow from each of the toilets towards an air outlet (34).

6. An installation according to claim 1, wherein each transfer device (20) includes electronic control means enabling it to operate as a function of the use of the toilets, the various control means being operated in mutually synchronized manner so as to allow only one of the transfer devices to operate at any one time.

7. An installation according to claim 1, wherein the reception tank (13) for liquid effluent (8) is integrated in the floor slab (5) of the toilet.

8. An installation according to claim 1, wherein the reception tank (13) for liquid effluent (8) includes a siphon cover (14) defining a passage for the liquid effluent leading into liquid effluent (8) stagnating in the tank, which tank is provided with a liquid effluent overflow removal pipe (16).

9. An installation according to claim 1, wherein the siphon cover (14) of the liquid effluent reception tank (13) is removable.

10. An installation according to claim 1, wherein at least one of the toilets (2) includes nozzles (18) for spraying cleaning liquid under pressure into the liquid effluent reception tank (13).

* * * * *